Dec. 22, 1970  R. G. CAPEK ET AL  3,549,415
METHOD OF MAKING MULTILAYER CERAMIC CAPACITORS
Filed July 15, 1968

Inventors
Raymond G. Capek
John P. Mazintas

By David P. Ogden
Attorney

United States Patent Office 3,549,415
Patented Dec. 22, 1970

3,549,415
METHOD OF MAKING MULTILAYER CERAMIC CAPACITORS
Raymond G. Capek, Elmhurst, and John P. Mazintas, Stickney, Ill., assignors to Zenith Radio Corporation, Chicago, Ill., a corporation of Delaware
Filed July 15, 1968, Ser. No. 745,012
Int. Cl. C23b 5/50
U.S. Cl. 117—215   5 Claims

ABSTRACT OF THE DISCLOSURE

Ceramic capacitors are made of several layers of dielectric ceramic material separating metal plates. By selecting titanate ceramics having different temperature coefficients of capacitance a preselected temperature characteristic is attainable. However, in order that the several ceramic powders do not diffuse during sintering, these materials are calcined prior to forming the several dielectric layers.

BACKGROUND OF THE INVENTION

The present invention relates to multilayer ceramic capacitors and to a method of forming them so that the temperature coefficient thereof is optimized.

Prior art capacitor manufacturers recognized that various ceramic compounds have different dielectric constants throughout a range of temperatures. Attempts to design a particular capacitive temperature coefficient (TC) have not proved entirely satisfactory because the several materials diffuse during sintering, as a result, the interaction of the several dielectric temperature coefficients of the several materials is no longer predictable in terms of the separate compositions used. It appears that the separate compositions of ceramic material have TC's which are primarily physical properties of the solid solution of ceramic. However, when the several powders are mixed, the resulting TC indicates that a portion of the reactions involved during the sintering process include chemical-like reactions causing substantially different solid solutions, whereby the TC of the resulting ceramic is no longer meaningfully related to the ingredients proportions.

SUMMARY OF THE INVENTION

Therefore, it is an object of the present invention to provide an improved multilayer ceramic capacitor and method for manufacturing it.

In accordance with an embodiment of this invention, the new method of forming a multilayer dielectric structure results in a temperature compensated dielectric coefficient throughout a range of operational temperatures. As a first step a ferroelectric material is prepared and calcined at a temperature of at least about 2275° F. to form a solid solution thereof. A second ferroelectric material is selected and calcined at a temperature of at least about 2275° F. The two calcined materials are then formed into separate contiguous overlapping layers which are sintered. Because of the precalcining no diffusion between layers occurs during the sintering step. When making a multiple plate capacitor of this multilayer dielectric structure capacitor plates are applied to both sides of the dielectric layers.

BRIEF DESCRIPTION OF THE DRAWING

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements and in which:

DESCRIPTION OF THE PREFERRED EMBODIMENTS

Figure 1:
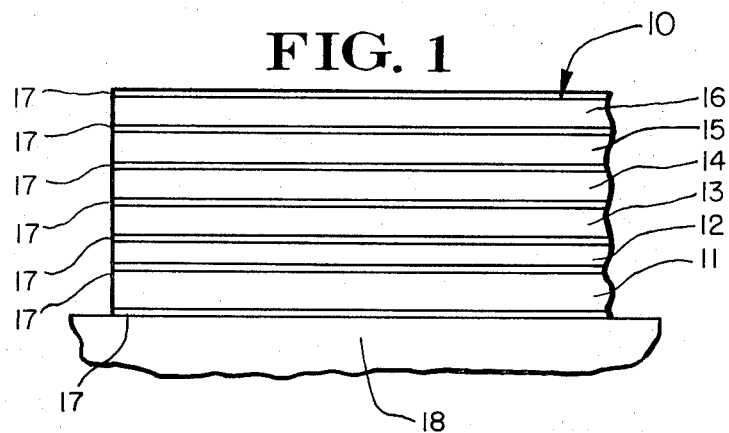
FIG. 1 is an elevation view of a capacitor formed in accordance with the present invention.

In the drawings, FIG. 1 illustrates a typical multilayer capacitor 10 having, by way of example, layers 11, 12, 13, 14, 15 and 16 formed of selected ferroelectric materials and capacitor plates 17 of metal such as palladium, gold and/or platinum. Alternate plates 17 are coupled to a pair of terminals respectively in a conventional manner. It is a common practice to make dielectric layers as thin as permissible. One criteria is the dielectric strength of the ceramic layers. Also it is well known that TC causes dielectric characteristics to vary with temperature change. According to the present invention, layers 11–16 are selected to have different dielectric TC characteristics which interact so that capacitance of capacitor 10 follows a preselected TC curve throughout a range of temperatures such as 25° C. to 120° C.

Dielectric materials which work well in the invention are primarily titanate ceramic compositions. In fact, the several compositions used to fabricate one constant TC capacitor were formed of 80 to 90.5 percent barium titanate. Depending on the particular TC characteristics of the several materials used for the layers 11–16, layers may be of substantially different thickness such as 12 being thinner than 11. On the other hand, one type of material may be used to form several layers (of equal thickness because of identical dielectric strength) such as layers 13 and 14.

As discussed in greater detail below, the capacitor 10 is initially formed on a substrate indicated at 18. One substrate 18 that works well is a Mylar sheet which has been coated with a release agent such a a fluorocarbon marketed by Miller Stephenson Chemical Company as MS–122.

Figure 2:
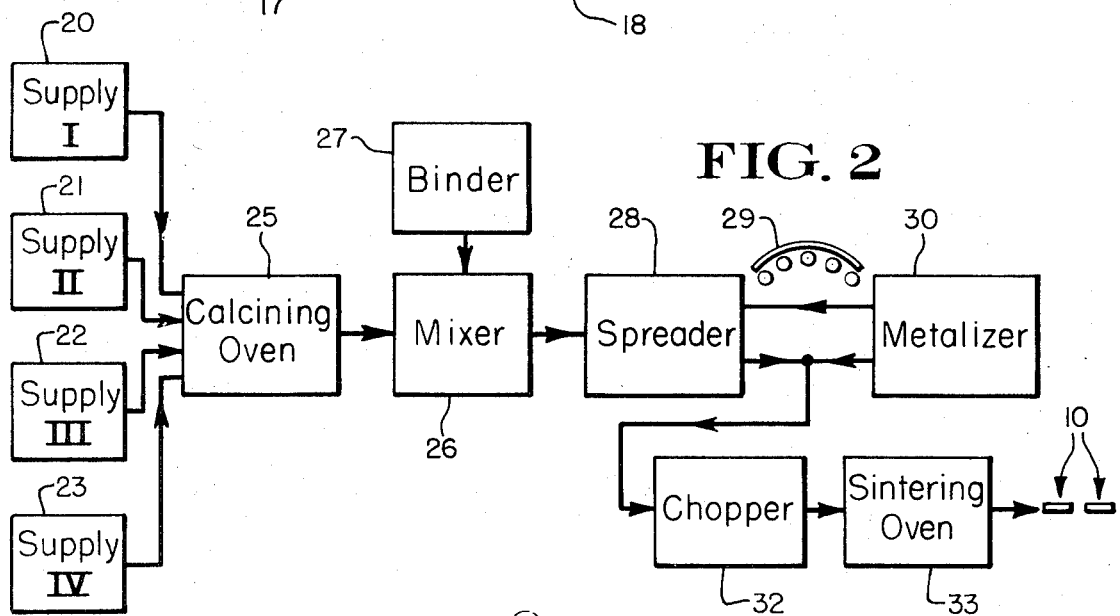
FIG. 2 is a block diagram illustrating the several equipments necessary to carry out the present invention.

Referring now to FIG. 2, a block diagram illustrates the method of preparing a ceramic capacitor having a controlled temperature coefficient capacitor characteristic. Several dielectric material supplies 20, 21, 22 and 23 supply different titanates to a calcining oven 25. In oven 25 the previously prepared materials as by mixing and grinding are calcined, for about two hours, at temperatures above 2200° F. With all materials tested to date, a calcining temperature of 2300° F. provides a satisfactory layer formation material. In other words at temperatures of about 2300° F. the compositions became solid solutions. In other words, when calcined at 2300° F. and sintered about two hours at 2450° F. no diffusion between layers was detected. Sintering time and temperature are both near minimum for the particular materials used.

Next the dielectric materials are broken up and mixed in a mixer 26 in about a 1:1 ratio with binder-plasticizer material such as 52% toluene, 25% polyethylene glycol (having viscosity of 600–700 Saybolt seconds at 100° F.), 13% polyvinyl butyral and 10% polyethylene glycol (having viscosity of 2000 Saybolt seconds at 100° F.), all previously mixed and supplied from a source 27. Such binders will be driven off completely during the usual sintering process. Also water base binders may be used, but they tend to evaporate more slowly. The mixtures are formed into layers by a conventional type spreader 28. For instance, one using a doctor blade works quite satisfactorily.

In practicing the method of this invention substrate 18 is first coated with a metal layer 17. Next, the first layer 11 is spread on substrate 18 to a thickness of about 2 to 15 thousandths of an inch depending upon its dielectric strength throughout the operating temperature range. Then metal plate 17 coating of about 5 to 10 microns thickness is applied thereto prior to applying a second dielectric coating. Between coatings the substrate and layers pass through a drier 29. The coating of metal is applied by a device indicated as a metalizer 30 utilizing one of several well-known metalizing techniques such as stencil screening, sputtering, vapor deposition, electroforming, spraying or like methods of producing a very thin uniform coating in preselected areas. Substrate 18 is then returned to spreader 28 where a next dielectric coating is applied over the metal plate 16. Another layer of metal 17 is applied over the second coating. This process continues until capacitor 10 has a sufficient number of plates 17 and a selected total thickness of each of the dielectric materials 20–23. An in-line process may be used instead of the batch process.

As an alternate method capacitors 10 may be formed by combining several preformed and metal coated layers. In other words, the layer is formed and metal coated and then the layers are stacked and dried.

The several capacitors 10 are then separated by a punch or chopper 32 into the size capacitor units to be used. Typically such capacitors are .75" x .100" x .050" and have six to twelve layers of ferroelectric insulation material. Individual layers vary from about .002" to about .015". An average layer thickness for low voltage circuits is about .006". The complete capacitor assembly is then sintered in an oven 33 to be solidified.

We have found that without calcining, the particular titanate materials used migrate or diffuse between dielectric layers to cause a diffusion zone. When this happens, the entire capacitor structure has a TC much as if the various powders were homogeniously dispersed throughout the bulk of capacitor 10. Such dispersion results in a TC of capacitance for the completed device having no discernible relation to the several different materials used. On the other hand, with calcining of our present invention, such diffusion is eliminated and each layer performs in a predictable manner so that the several layers provide a cumulatively predictable TC. By selecting the several materials to have certain TC characteristics, the finished product TC is controlled only when diffusion is prevented.

In order to better appreciate the present invention it should be noted that the dielectric constant "K" is defined by $K = Ct/.225A$ where $C$ is capacitance is picofarads, $t$ is thickness in inches and $A$ is area in square inches.

Figure 3:
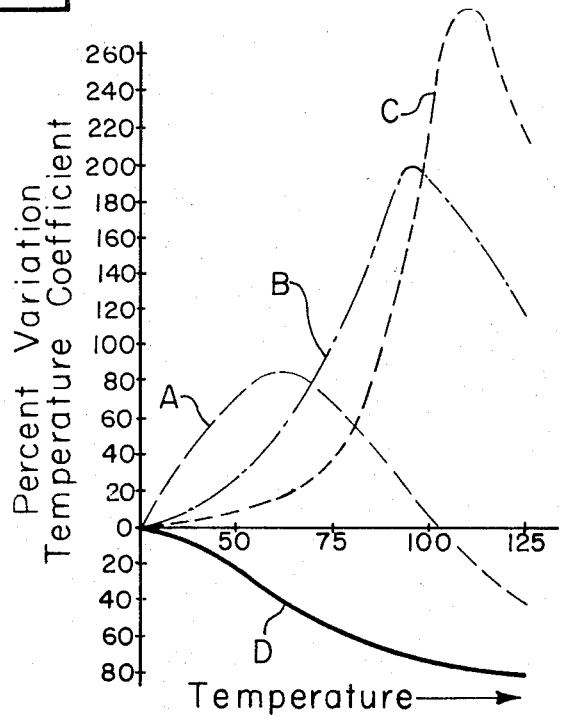
FIG. 3 is a curve illustrating temperature coefficients of several specific ceramic compositions useable with the present invention.

Referring now to FIG. 3, there is shown a percentage variation of temperature coefficient for several dielectric materials with a temperature variation from 25° C. to about 120° C. Composition A consists of 88% by weight of barium titanate, 10% calcium zirconate, 1% zircon and 1% magnesium zirconate. After calcining at 2400° F., $K_A$ equals about 2510 at 25° C. The temperature coefficient increases rapidly during temperature increases from about 25° C. to about 60° C. Above about 70° C. TC of this material decreases at an essential uniform rate going negative at about 100° C.

After calcining, composition B, consisting of 90% $BaTiO_3$, 6.5% $CaTiO_3$ ½% $ZrSiO_4$, 1% $MgZrO_3$, and $SrZrO_3$, has a $K_B = 1435$ which increases with temperature reaching a peak at approximately 95° C. with the initial slope much less than material A. Since $K_B$ is low, B should be made thin as indicated by layer 12, e.g., .003". Material C is 90.5% $BaTiO_3$, 4.5% $CaTiO_3$ and ½% $ZrSiO_4$ having $K_C = 2280$ at 25° C., and initially has a very slight positive slope with this slope increasing rapidly in the region between 75 to 100° C. and becoming negative above about 110° C. Composition D is 80% $BaTiO_3$, 10% $CaTiO_3$, 9% $SrTiO_3$, ½% $TiO_2$, $La_2O_3$ with $K_D = 3450$ and has a negative temperature coefficient with the slope of TC being more or less uniform throughout the entire range under consideration. The lanthanum oxide is avaliable from several sources. All of the other compounds are obtainable from Titanium Alloy Manufacturing Company, a division of National Lead Company.

By making layer 11 of composition A (because of the curve of FIG. 3), layer 12 of composition B, layers 13 and 14 of composition C, and layers 15 and 16 of composition D, the capacitor of FIG. 1 will have a substantially uniform TC throughout the temperature range of 25° C. to about 120° C.

If the dielectric material were not calcined, the capacitor of FIG. 1 would suffer substantial interlayer diffusion. The resulting TC is positive, but has no particular relation to the curves shown in FIG. 3. This apparent anomaly is because of intermixing of the several powders which causes the solid solutions to be modified substantially.

Obviously, several other known dielectric materials may be used to form layers 11–16 to obtain somewhat different TC characteristics. For instance, integrating circuits may be designed with a capacitor TC which counteracts impedance changes of an associated resistor. Moreover, we have found that it is not necessary to apply the particular materials used in any preselected sequential arrangement to attain a uniform dielectric TC. By way of example, several layers of component D may be near one surface, or in the center of a capacitor body.

Also the capacitor (10) can be made as a series or series-parallel capacitor; e.g., having several layers of different dielectric compositions between the two or more plates respectively.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

We claim:
1. A method of forming a multilayer dielectric structure having a temperature compensated dielectric coefficient throughout a range of operational temperatures, including the steps of:
  preparing a first ferroelectric material having a high dielectric constant and a preselected tempearture coefficient;
  calcining said material at a temperature of at least about 2275° F. to form a solid solution;
  mixing said calcined material with a binder;
  forming the first calcined material and binder into a first distinct layer on a substrate;
  preparing a second ferroelectric material having a high dielectric and a preselected temperature coefficient different from that of said first material;
  calcining said second material at a temperature of at least about 2275° F. to form a solid solution;
  mixing said second material with a binder;
  forming said second calcined material and binder into a second layer which overlies said first layer;
  and thereafter, firing said first and second calcined layers to drive off the binder and sinter the ceramic particles together respectively without creating a substantial diffusion zone in either of the layers.

2. A method of forming a multilayer dielectric structure according to claim 1, comprising the further steps of:
  applying a conductive material to form a first conductive layer between said first and second dielectric layers to form a capacitor plate;
  and forming a conductive layer separated from said first conductive layer by one of said calcined layers to form a second capacitor plate.

3. The method of forming a multilayer dielectric structure according to claim 2, wherein the steps are repeated to provide at least three dielectric layers and at least four closely spaced conductive capacitor plates.

4. The method of forming a capacitor according to claim 3, wherein the thickness of the dielectric layers is selected to yield a preselected capacitance characteristic throughout a range of temperatures.

5. The method of forming a capacitor according to claim 4 including the step of:

selecting the dielectric materials so that the calcining step results in at least one layer of a dielectric material having a negative temperature coefficient throughout at least a portion of the range of operational temperatures.

References Cited

UNITED STATES PATENTS

| | | | |
|---|---|---|---|
| 3,273,033 | 9/1966 | Rossmeisl | 117—215X |
| 3,280,448 | 10/1966 | Brajer | 29—25.42 |
| 3,305,394 | 2/1967 | Kaiser et al. | 117—215X |
| 3,400,001 | 9/1968 | Hasumi et al. | 317—258X |

JOHN F. CAMPBELL, Primary Examiner

C. E. HALL, Assistant Examiner

U.S. Cl. X.R.

29—25.42; 117—217, 219, 221; 264—61; 336—258